United States Patent Office 3,306,919
Patented Feb. 28, 1967

3,306,919
CYCLOPENTADIENYL TITANIUM COMPOUNDS
John C. Brantley, Amherst, Edward L. Morehouse, Snyder, and Leo Parts, Buffalo, N.Y., assignors to Union Carbide Corporation, a corporation of New York
No Drawing. Filed Jan. 15, 1958, Ser. No. 708,994
12 Claims. (Cl. 260—429.5)

This invention relates to cyclopentadienyl titanium compounds. More particularly, this invention relates to compounds of titanium wherein each titanium atom is bonded to not more than one cyclopentadienyl group.

Organometallic compounds in which cyclopentadienyl groups are directly bonded to the metal atom have been known since 1951 when bis(cyclopentadienyl)iron was described by Kealy and Pauson (Nature, 168, p. 1039). Organo-titanium compounds in which each titanium atom is bonded to two cyclopentadienyl rings have also been prepared, and such compounds are disclosed and claimed in copending applications Serial No. 381,962, filed September 23, 1953, by John C. Brantley and Serial No. 555,251, filed December 27, 1955, by John C. Brantley.

We have now discovered a new and useful class of organo-titanium compounds in which each titanium atom is directly bonded to not more than one cyclopentadienyl or substituted cyclopentadienyl ring. The compounds of this invention may be monomeric, such as $C_5H_5TiCl_3$, or polymeric such as $HO[(C_5H_5)TiO(OH)]_nH$. The existence of such mono-(cyclopentadienyl)titanium compounds is unexpected, particularly in view of the usual types of bonding in the known cyclopentadienyl metal compounds. The number of bonding electrons in cyclopentadienyl metal compounds is usually equal to the number of electrons in the outer shell of the next rare gas. For example, in bis(cyclopentadienyl)iron the iron atom provides 8 bonding electrons and each cyclopentadienyl radical provides 5 for a total of 18. The next rare gas, krypton, has 18 electrons in its outer electron shell. Also, in cyclopentadienyl chromium tricarbonyl hydride (Fischer et al., Z. Anorg. Allgem. Chem., 282, 47, 1955) the chromium provides 6 bonding electrons, the cyclopentadienyl radical provides 5, each carbonyl provides 2 and the hydrogen 1 for a total of 18.

For the mono(cyclopentadienyl)titanium compounds the infrared spectrum shows that the cyclopentadienyl ring is bonded to the metal atom in the same manner as in bis(cyclopentadienyl)iron. However, the total number of bonding electrons in mono(cyclopentadienyl)titanium compounds is 12 rather than 18. For example, in $C_5H_5TiCl_3$ the titanium provides 4 bonding electrons, the cyclopentadienyl radical provides 5 and each chlorine provides 1 for a total of 12. The existence and stability of the mono(cyclopentadienyl)titanium compounds could not have been predicted in view of this unusual configuration of bonding electrons.

The existence of the mono(cyclopentadienyl)titanium compounds was demonstrated by both molecular weight determination (see Example I hereinbelow) and infrared spectographic analysis. The identification by infrared analysis is based on a frequency shift in the bands in the 12 micron region which are attributed to the carbon-hydrogen bending vibrations. For the mono(cyclopentadienyl)titanium compounds these bands show a shift toward lower frequencies than the corresponding bands of bis(cyclopentadienyl)titanium compounds. One theory is that this shift results from the fact that the carbon-hydrogen bending motions are less hindered in the compounds containing only a single cyclopentadienyl ring.

The monomeric compounds have the general formula $RTiX_{3-m}Y_m$ wherein R is a cyclopentadienyl group or substituted cyclopentadienyl group, X is a halogen, Y is a halogen different from X or an alkoxy group, and $m$ is 0, 1, 2 or 3. The polymeric compounds of this invention have the general formula $$Z[RTiOZ]_nH$$

wherein R is a cyclopentadienyl group or substituted cyclopentadienyl group, Z is a halogen or hydroxyl group and $n$ is an integer greater than 3.

The R group in the general formulas hereinabove may be cyclopentadienyl; an alkyl- or alkylene-substituted cyclopentadienyl such as methylcyclopentadienyl, ethylcyclopentadienyl or tetrahydroindenyl; or an alkenyl-substituted cyclopentadienyl such as allylcyclopentadienyl. The R group may also be an indenyl group. The X group may be any halogen, having an atomic weight less than about 128, preferably chlorine, bromine or iodine. The Y group in the general formula above may be halogen having an atomic weight less than about 128, preferably chlorine, bromine or iodine; an alkoxy group such as methoxy, ethoxy or butoxy; or the hydroxyl group.

The compounds of this invention are useful in conjunction with trialkylaluminum compounds as polymerization catalysts for ethylenic hydrocarbons or styrene oxides.

We have also discovered that the monomeric compounds of this invention may be prepared by four general reactions: (1) by the reaction of a bis(cyclopentadienyl)titanium dihalide with a titanium tetrahalide, $R_2TiX_2 + TiX_4$; (2) by the reaction of an alkali metal (represented by the letter M) cyclopentadienide with an excess of a titanium tetrahalide, $RM + TiX_4$; (3) by the reaction of a bis(cyclopentadienyl)titanium dihalide with a halogen; $R_2TiX_2 + X_2$; and (4) by the disproportionation of a bis(cyclopentadienyl)titanium dialkoxide, $R_2TiY_2$. Examples I–IV illustrate the preparation of the monomeric compounds of this invention by the methods outlined in this paragraph above. The preparation of the starting materials used in Examples I–IV, namely $R_2TiX_2$ and RM, is described in detail in copending applications Serial No. 381,962, filed September 23, 1953, now abandoned, and Serial No. 555,251, filed December 27, 1955, now abandoned, referred to hereinabove, and Serial No. 381,970, filed September 23, 1953, now abandoned, by Maurice A. Lynch, Jr. and John C. Brantley. It is understood that such starting materials and the processes for preparing them form no part of the present invention.

Mono(cyclopentadienyl)titanium trihalides may be prepared by the reaction of a bis(cyclopentadienyl)titanium dihalide and a titanium tetrahalide. The reaction may be carried out at temperatures between about −30° C. and 100° C., preferably in the absence of air and moisture. Air and moisture may be conveniently excluded by providing an atmosphere of inert gas such as argon or nitrogen. The reaction may be carried out in an inert aromatic solvent such as benzene or toluene, but it is preferable to omit the inert solvent when titanium tetrachloride (melting point −30° C.) or titanium tetrabromide (melting point 39° C.) are employed.

*Example I*

$(C_5H_5)_2TiCl_2 + TiCl_4 \rightarrow 2(C_5H_5)TiCl_3$

Bis(cyclopentadienyl)titanium dichloride (49.8 grams) and titanium tetrachloride (300 grams) were transferred into a 1-liter, 3-necked flask equipped with a mechanical stirrer and reflux condenser. The reaction was carried out under argon. The reaction mixture was stirred for 2 hours at room temperature, then stirred at 75° C. for 1.5 hours. The crude product was isolated by filtration under an argon atmosphere. The titanium tetrachloride-insoluble fraction of the product weighed 66.6 grams. It was dark brownish-red in appearance. The titanium tetrachloride-soluble product weighed 7.8 grams. The titanium tetrachloride-soluble fraction of the product was brown in color and contained some yellow needle-like crystals. The crude solid products were combined. Orange-yellow $(C_5H_5)TiCl_3$ was isolated from the crude products by vacuum-sublimation at 100° C. Yield based on $(C_5H_5)_2TiCl_2$ was 13.6%. M.P.=190°–195° C.

*Analysis* (wt. percent).—Calculated: C, 27.37; H, 2.30; Ti, 21.84; Cl, 48.49; M. wt., 219.36. Found: C, 27.3; H, 2.7; Ti, 21.8; Cl, 48.8; M. wt., 224.

Mono(cyclopentadienyl)titanium trihalides may also be prepared by the reaction of a titanium tetrahalide and an alkali metal cyclopentadienide. Preferably, an excess of the titanium tetrahalide should be used in order to favor the formation of the mono(cyclopentadienyl)titanium compound rather than the bis(cyclopentadienyl)titanium compound. It is also preferred to use an aromatic solvent such as benzene, toluene, or xylene. Cyclic ethers such as tetrahydrofuran are unsatisfactory as solvents because they are polymerized by the product, mono(cyclopentadienyl)titanium trihalide. It is also preferred to add the alkali metal cyclopentadienide to the titanium tetrahalide in the solvent to maintain an excess of $TiX_4$ at all times, thus favoring the formation of mono(cyclopentadienyl)titanium derivatives. The reaction temperature may be between about −50° C. and 50° C.

*Example II*

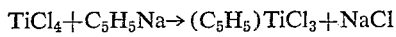

$TiCl_4 + C_5H_5Na \rightarrow (C_5H_5)TiCl_3 + NaCl$

An atmosphere of inert gas was maintained throughout the preparation. Sodium cyclopentadienide was prepared from 11.5 grams of sodium and 49.6 grams of freshly distilled cyclopentadiene in 500 ml. of liquid ammonia at −40° C. After the reaction was complete the ammonia and cyclopentene were removed by distillation. The yield of sodium cyclopentadienide was 98%.

Next, 94.9 grams of $TiCl_4$ was dissolved in 700 ml. of toluene. Sodium cyclopentadienide, prepared as above, was added to the $TiCl_4$ solution over a period of 1.25 hours at 0° C. The reaction mixture was allowed to stand overnight at room temperature. It was then filtered. The filter cake consisted mainly of $(C_5H_5)_2TiCl_2$ and NaCl. $(C_5H_5)TiCl_3$ was recovered from the filtrate in a yield of 13.3% by sublimation under vacuum. The product was identical to that described in Example I.

Mono(cyclopentadienyl)titanium trihalides containing two or more different halides may be prepared by the halogenation of bis(cyclopentadienyl)titanium dihalides. It is preferable to use bromine as the halogenating agent because bromine is a liquid and no inert organic solvent is required. When chlorine gas or solid iodine are used as the halogenating agents, an inert solvent is required. Chloroform is the preferred solvent. Aromatic solvents should not be used because there is sufficient titanium tetrahalide present to catalyze the halogenation of the aromatic ring. The reaction may be carried out at temperatures between about −30° C. and 50° C., room temperature being most convenient, and air and moisture should preferably be excluded.

*Example III*

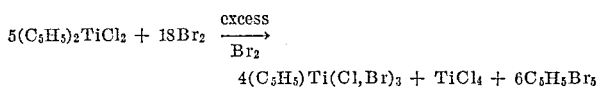

$5(C_5H_5)_2TiCl_2 + 18Br_2 \xrightarrow{excess\ Br_2}$
$4(C_5H_5)Ti(Cl,Br)_3 + TiCl_4 + 6C_5H_5Br_5$ Bis(cyclopentadienyl)titanium dichloride (24.9 grams) and bromine (340.5 grams) were reacted in a 1-liter, 3-necked flask provided with a mechanical stirrer, reflux condenser, and a flask for the addition of solid bis(cyclopentadienyl)titanium dichloride. The air in the system was displaced by argon and the reaction was carried out under an argon atmosphere. The addition of bis(cyclopentadienyl)titanium dichloride to bromine required 30 minutes. The reaction was allowed to proceed for 21 hours at room temperature. After the removal of unreacted bromine the mixture of solid products, containing 1–2 ml. of liquid materials weighed 70.7 grams. This mixture was dissolved in 200 ml. of chloroform. After the removal of 4.2 grams of chloroform-insoluble decomposition products by filtration, a homogeneous orange solution was obtained. A fractionation of the products was obtained by removal of successive amounts of chloroform under reduced pressure and by filtration of the separating solids. The first fractions were identified as $(C_5H_5)Ti(Cl,Br)_3$.

The halogenation of the bis(cyclopentadienyl)titanium dihalide may also be carried out in the presence of an inert organic solvent such as chloroform. When a solvent is used, the halogen-substituted cyclopentadiene recovered contains three halogen atoms in contrast to five atoms in the absence of an inert solvent. For example,

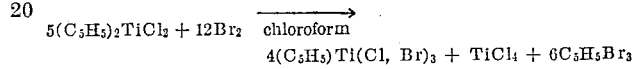

$5(C_5H_5)_2TiCl_2 + 12Br_2 \xrightarrow{chloroform}$
$4(C_5H_5)Ti(Cl,Br)_3 + TiCl_4 + 6C_5H_5Br_3$ The mono(cyclopentadienyl)titanium trihalide produced in the presence of a solvent is identical with that formed in the absence of an inert solvent.

Mono(cyclopentadienyl)titanium trialkoxides may be prepared by the disproportionation of a bis(cyclopentadienyl)titanium dialkoxide. A bis(cyclopentadienyl)titanium dialkoxide is first prepared by any convenient method such as the reaction between a bis(cyclopentadienyl)titanium dihalide and an aliphatic alcohol in the presence of an amine. (The process for preparing bis(cyclopentadienyl) metal compounds in the presence of an amine is described in copending application Serial No. 488,433, filed February 15, 1955, by Edward L. Morehouse, now Patent No. 3,071,605.) The bis(cyclopentadienyl)titanium dialkoxide then disproportionates into mono(cyclopentadienyl)titanium trialkoxide. The disproportionation reaction is very rapid and isolation of the dialkoxide is difficult. The reaction may be carried out at temperatures between about −30° C. and 100° C., preferably at room temperature with the exclusion of air and moisture.

*Example IV*

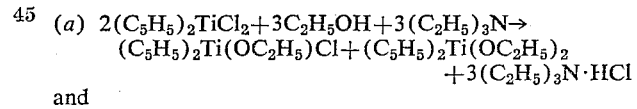

(a) $2(C_5H_5)_2TiCl_2 + 3C_2H_5OH + 3(C_2H_5)_3N \rightarrow$
$(C_5H_5)_2Ti(OC_2H_5)Cl + (C_5H_5)_2Ti(OC_2H_5)_2$
$+ 3(C_2H_5)_3N \cdot HCl$ and

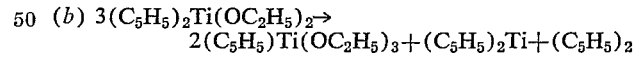

(b) $3(C_5H_5)_2Ti(OC_2H_5)_2 \rightarrow$
$2(C_5H_5)_2Ti(OC_2H_5)_3 + (C_5H_5)_2Ti + (C_5H_5)_2$ One-tenth mole (24.9 grams) of bis(cyclopentadienyl)titanium dichloride, 9.2 grams (.2 mole) of $C_2H_5OH$ and 100 ml. of toluene were placed in a 500 ml., 3-necked flask which was provided with a pressure equalized dropping funnel, mechanical stirrer, and a reflux condenser. 0.4 mole of $(C_2H_5)_3N$, dissolved in 100 ml. of toluene, was added through dropping funnel with rapid stirring over a period of 20 minutes. The reaction was carried out under argon at room temperature. The stirring was continued for 5.5 hours. After standing overnight, the mixture was filtered under argon. The

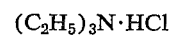

$(C_2H_5)_3N \cdot HCl$ was washed with 100 ml. of toluene, and the remaining toluene was removed in a vacuum desiccator. The yield of $(C_2H_5)_3N \cdot HCl$ was 0.163 mole.

The filtrate of the reaction mixture and the toluene used for washing were combined. Toluene was removed by distillation at room temperature under reduced pressure. The weight of the crude product, part solid and part liquid, was 23.1 grams.

Solid bis(cyclopentadienyl)titanium ethoxy chloride was separated from the crude product by filtration, and was subsequently washed with n-heptane. The yield was 3.90 grams (0.0151 mole).

*Analysis.*—Calculated for $(C_5H_5)_2Ti(OC_2H_5)Cl$: C=55.73%, H=5.85%, Ti=18.52%, Cl=13.71%. Found: C=55.5%, H=5.1%, Ti=16.8%, Cl=13.5%, M.P. 92–93° C.

The liquid phase of the 23.1 grams of crude product was fractionated by molecular distillation. 9.21 grams of yellow liquid was collected which distilled at 5–6 × $10^{-3}$ mm. and 54–80° C., and had refractive index= 1.5466.

Calculated for $C_5H_5Ti(OC_2H_5)_3$: C=55.23%; H=8.12%; Ti=19.30%. Found: C=52.5%; H=8.1%; Ti=18.4%.

This compound decomposes slowly at room temperature and is rapidly converted to a yellow solid on exposure to air.

We have further discovered that the polymeric compounds of this invention may be prepared by two general methods. Linear polymers of the general formula $HO[RTiO(OH)]_nH$, where R has the meaning defined hereinabove, are obtained by hydrolyzing a bis(cyclopentadienyl)titanium dihalide or mono(cyclopentadienyl)titanium trihalide with an aqueous solution of a base such as sodium hydroxide or sodium acetate. The solution may have a pH between about 7 and 14. It is preferable to use an aqueous solution of a weak base, such as sodium acetate or sodium bicarbonate.

Cyclic polymers having the general formula $[RTiOX]_4$, where X is a halogen and R has the meaning defined hereinabove, are obtained by hydroylzing a mono(cyclopentadienyl)titanium trihalide with an aqueous solution of a hydrohalogen acid. No detectable quantities of mono(cyclopentadienyl)titanium compounds were obtained by treating a bis(cyclopentadienyl)titanium dihalide with aqueous hydrohalogen acid.

Examples V–VII illustrate the preparation of the polymeric products of this invention by the methods set forth above.

Polymeric organo-titanium compounds in which each titanium atom is bonded to not more than one cyclopentadienyl or substituted cyclopentadienyl ring may be prepared by treating a bis(cyclopentadienyl)titanium dihalide with an aqueous solution of a weak base.

*Example V*

$(C_5H_5)_2TiCl_2+CH_3COONa \rightarrow$
$\quad HO[(C_5H_5)TiO(OH)]_nH+NaCl+CH_3COOH$ An aqueous solution of $(C_5H_5)_2TiCl_2$ was allowed to react with an excess of $CH_3COONa$. A yellow precipitate was formed. After drying in a vacuum desiccator the compound decomposed at 220–230° C. The material was found to be insoluble in all the common solvents, such as benzene, chloroform or diethyl ether. On the basis of elemental analysis, the product of this reaction was $HO[(C_5H_5)TiO(OH)]_nH$. The infrared spectrum of the yellow solid showed that only one cyclopentadienyl group was bonded to each titanium atom.

The same polymeric yellow solid was obtained by treating bis(cyclopentadienyl)titanium dichloride with aqueous sodium bicarbonate according to the equation

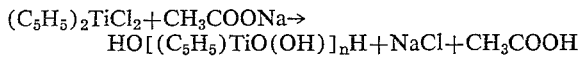
$(C_5H_5)_2TiCl_2 + NaHCO_3 \xrightarrow{H_2O} HO[(C_5H_5)TiO(OH)]_nH + NaCl + CO_2$ The following reaction was also carried out by the procedure of Example V:

$(C_5H_5)TiCl_3 + CH_3COONa \xrightarrow{H_2O} HO[(C_5H_5)TiO(OH)]_nH$

The structure of the mono(cyclopentadienyl)titanium polymers was identified by both elemental and infrared spectrographic analysis. Because of the insolubility of the polymers in all common solvents, an accurate determination of molecular weight could not be obtained. It is estimated, based on the extreme insolubility, that the value of $n$ is at least 10 and possibly as high as 20.

The cyclic tetramers of this invention may be prepared by the reaction of a cyclopentadienyl magnesium halide and a titanium tetrahalide followed by hydrolysis of the mono(cyclopentadienyl)titanium trihalide in the crude reaction mixture with an aqueous solution of a hydrohalogen acid. The cyclopentadienyl magnesium halide, a Grignard reagent, may be prepared by standard organic reactions. The reaction of the cyclopentadienyl magnesium halide with the titanium tetrahalide should be carried out at temperatures below about 0° C., preferably at Dry Ice temperatures. The temperature may be raised to room temperature as the reaction proceeds. The hydrolysis of the reaction mixture may conveniently be done at room temperature.

*Example VI*

(a) $Mg+CH_3Cl \rightarrow CH_3MgCl$
(b) $CH_3MgCl+C_5H_6 \rightarrow C_5H_5MgCl+CH_4$
(c) $C_5H_5MgCl+TiCl_4 \rightarrow C_5H_5TiCl_3+MgCl_2$
(d) $4C_5H_5TiCl_3+4H_2O \rightarrow [(C_5H_5)TiOCl]_4+8HCl$ Methyl magnesium chloride was prepared from 48.6 grams of magnesium turnings and methyl chloride at 0° C. The resulting Grignard compound was then reacted with 132 grams of cyclopentadiene. $TiCl_4$ (89 ml.) in 90 ml. of benzene was then added dropwise to the cyclopentadienyl magnesium chloride solution at Dry Ice temperatures in a nitrogen atmosphere. The reaction was allowed to proceed at this temperature for 45 minutes and subsequently allowed to warm slowly to room temperature. 350 ml. of benzene were added and the total volume of about 1800 ml. stirred for 4 hours. The resultant slurry was hydrolyzed with aqueous hydrochloric acid forming a two-phase system. The dark-red aqueous solution was extracted with benzene and the extract combined with the organic phase. The filtered organic solution was concentrated to 100 ml. and red and yellow crystals were precipitated. These red and yellow solids were separated by fractional extraction and recrystallization. The combined yield of solid products was 97.4 grams which consisted of 57.8 grams of yellow tetrameric cyclopentadienyl titanium oxychloride and 39.16 grams of red bis(cyclopentadienyl)titanium dichloride. A fraction of the yellow crystals was recrystallized from benzene and dried at room temperature. The elemental analysis of the yellow product was as follows:

Theoretical: C=36.8%, Ti=29.1%, H=3.9%, Cl=21.5%, O=9.6%; found: C=36.5%, Ti=29.32%, H=3.2%, Cl=26.1%, O=4.88% (by difference).

The molecular weight of this compound was 700±70; the molecular weight of the tetramer $[(C_5H_5)TiOCl]_4$ is 658.

The cyclic tetramers of this invention may also be prepared by the reaction of a cyclopentadiene with a titanium tetrahalide in the presence of an amine followed by hydrolysis of the crude reaction mixture. This reaction is discussed in detail in copending application Serial No. 488,433, filed February 15, 1955.

*Example VII*

Titanium tetrachloride (0.125 gram-mole) was added to 0.25 gram-mole of cyclopentadiene in 175 ml. of diethylamine. The mixture was stirred about 2 hrs. at about 25° C. and about 1½ hrs. at about 67° C. The mixture was then poured into dilute hydrochloric acid and filtered. Both filter cake and filtrate were extracted with chloroform, then both chloroform layers were vacuum stripped to dryness and the residue recrystallized from benzene. The product consisted of red crystals of $(C_5H_5)_2TiCl_2$ and a smaller fraction of yellow crystals of $[C_5H_5TiOCl]_4$.

The compounds of this invention are useful, in conjunction with trialkyl aluminum compounds, as catalysts for the polymerization of ethylenic hydrocarbons such as ethylene, propylene and butylene. The compounds may also be used alone for the polymerization of styrene oxides, such as styrene oxide, p-methyl styrene oxide and alpha methyl styrene oxide. The compounds of this invention are much more stable to hydrolysis and air oxidation than other titanium compounds which may be used as polymerization catalysts, such as titanium tetrahalides. In comparison with the titanium tetrahalides the mono(cyclopentadienyl)titanium trihalides are solid substances which do not fume in air and are much more resistant to hydrolysis. The mono(cyclopentadienyl)titanium trihalides are thermally stable at room temperature for long periods of time.

The following experiment demonstrates the use of a mono(cyclopentadienyl)titanium trihalide as a catalyst for the polymerization of ethylene. 3.0 grams (.015 mole) of triisobutyl aluminum were added to a solution of 2.29 grams (10 mmoles) of mono(cyclopentadienyl) titanium trichloride in 70 ml. of benzene. The solution was mixed well and added to 500 ml. of benzene in a 1-liter flask fitted with a stirrer, condenser, and thermometer. All operations were carried out under a nitrogen atmosphere. The solution was stirred and heated to 50° C. and ethylene was bubbled through the solution for three hours. A solid precipitated which was removed by filtration, washed first with acidified isopropyl alcohol and finally with pure alcohol. 1.5 grams of polyethylene were obtained. Triisobutyl aluminum alone does not catalyze the polymerization of ethylene.

What is claimed is:
1. Mono(cyclopentadienyl)titanium triethoxide.
2. As compositions of matter the organometallic compounds having the general formula

$$Z[RTiOZ]_nH$$

wherein R is a group selected from the class consisting of cyclopentadienyl, mono lower alkyl-substituted cyclopentadienyl, mono lower alkylene-substituted cyclopentadienyl, mono lower alkenyl-substituted cyclopentadienyl and indenyl; Z is a group selected from the class consisting of halogens having atomic weight less than about 128 and hydroxyl; and $n$ is an integer greater than 3 and less than about 20.

3. The compositions of matter in accordance with claim 2 wherein Z is the hydroxyl group.

4. The polymeric mono(cyclopentadienyl)titanium compound $$HO[(C_5H_5)TiO(OH)]_nH$$

wherein $n$ is an integer greater than about 3 and less than about 20.

5. Process for the production of organometallic compounds having the general formula $$RTiX_3$$

wherein R is a group selected from the class consisting of cyclopentadienyl, mono lower alkyl-substituted cyclopentadienyl, mono lower alkylene-substituted cyclopentadienyl, mono lower alkenyl-substituted cyclopentadienyl, and indenyl; and X is a halogen having an atomic weight less than about 128, which process comprises reacting an organo-titanium dihalide having the general formula $R_2TiX_2$, wherein R and X have the meanings defined hereinabove, with a titanium tetrahalide having the general formula $TiX_4$, wherein X has the meaning defined hereinabove.

6. Process in accordance with claim 5 wherein R is the cyclopentadienyl group and X is selected from the group consisting of chlorine, bromine and iodine.

7. As compositions of matter, the organometallic compounds having the general formula $$RTiY_3$$

wherein R is a group selected from the class consisting of cyclopentadienyl, mono-lower-alkyl-substituted cyclopentadienyl, mono-lower-alkylene-substituted cyclopentadienyl, mono-lower-alkenyl-substituted cyclopentadienyl and indenyl, and Y is a lower alkoxy group.

8. A process for the production of organometallic compounds having the general formula $$RTiY_3$$

wherein R is a group selected from the class consisting of cyclopentadienyl, mono-lower-alkyl-substituted cyclopentadienyl, mono-lower-alkylene-substituted cyclopentadienyl, mono-lower-alkenyl-substituted cyclopentadienyl and indenyl, and Y is a lower alkoxy group, which process comprises the disproportion of an organometallic compound having the general formula $$R_2TiY_2$$

wherein R and Y have the meanings defined hereinabove at a temperature between about −30° C. and about 100° C. with the exclusion of air and moisture.

9. A process for the production of cyclopentadienyl titanium triethoxide which comprises the disproportionation of bis(cyclopentadienyl)titanium diethoxide at about room temperature with the exclusion of air and moisture.

10. A process for the production of cyclopentadienyl titanium trichloride which comprises reacting bis(cyclopentadienyl)titanium dichloride with titanium tetrachloride.

11. Process in accordance with claim 8 wherein R is the cyclopentadienyl group.

12. Tetrakis(cyclopentadienyl titanium chloride) tetroxide.

References Cited by the Examiner

UNITED STATES PATENTS 2,818,416  12/1957  Brown et al. _____ 260—429

OTHER REFERENCES

Herman et al.: "J.A.C.S." 75, 3882–3887 (1953).

HELEN M. McCARTHY, *Acting Primary Examiner.*

ABRAHAM H. WINKELSTEIN, TOBIAS E. LEVOW,
*Examiners.*

B. D. WIESE, J. C. LANGSTON, L. BROWN, W. J. VAN BALEN, H. M. S. SNEED,
*Assistant Examiners.*